United States Patent
Kiewicz et al.

[15] 3,670,420
[45] June 20, 1972

[54] GAGING HEAD CONSTRUCTION

[72] Inventors: Frank M. Kiewicz, Detroit; Paul R. Zink, Farmington, both of Mich.

[73] Assignee: Inspection Engineering and Equipment, Inc., Royal Oak, Mich.

[22] Filed: Jan. 4, 1971

[21] Appl. No.: 103,592

[52] U.S. Cl. ..........................33/174 L, 33/169 B, 33/172 E
[51] Int. Cl. ........................................G01b 7/12, G01b 7/14
[58] Field of Search ..............33/143 L, 143 N, 174 L, 172 E; 200/47, 61.42

[56] References Cited

UNITED STATES PATENTS 3,557,462   1/1971   Kiewicz ..................................33/174

Primary Examiner—Leonard Forman
Assistant Examiner—Paul G. Foldes
Attorney—Benjamin W. Colman

[57] ABSTRACT

A work piece gaging head functioning in association with an electronic circuit, comprising an electrical switch-type gaging structure embodying features providing adjustable positioning to very substantial tolerances and having an indicator point and stem not only adapted to contact a work piece surface for gaging but also being substantially retractable from such surface to allow for excesses of work piece material in the gaging area. The gaging head embodies circuitry components designed to signal the presence of an undersized or an oversized dimension, and to indicate the "go" dimension which lies within the predetermined high and low limits of the gaging system.

14 Claims, 12 Drawing Figures

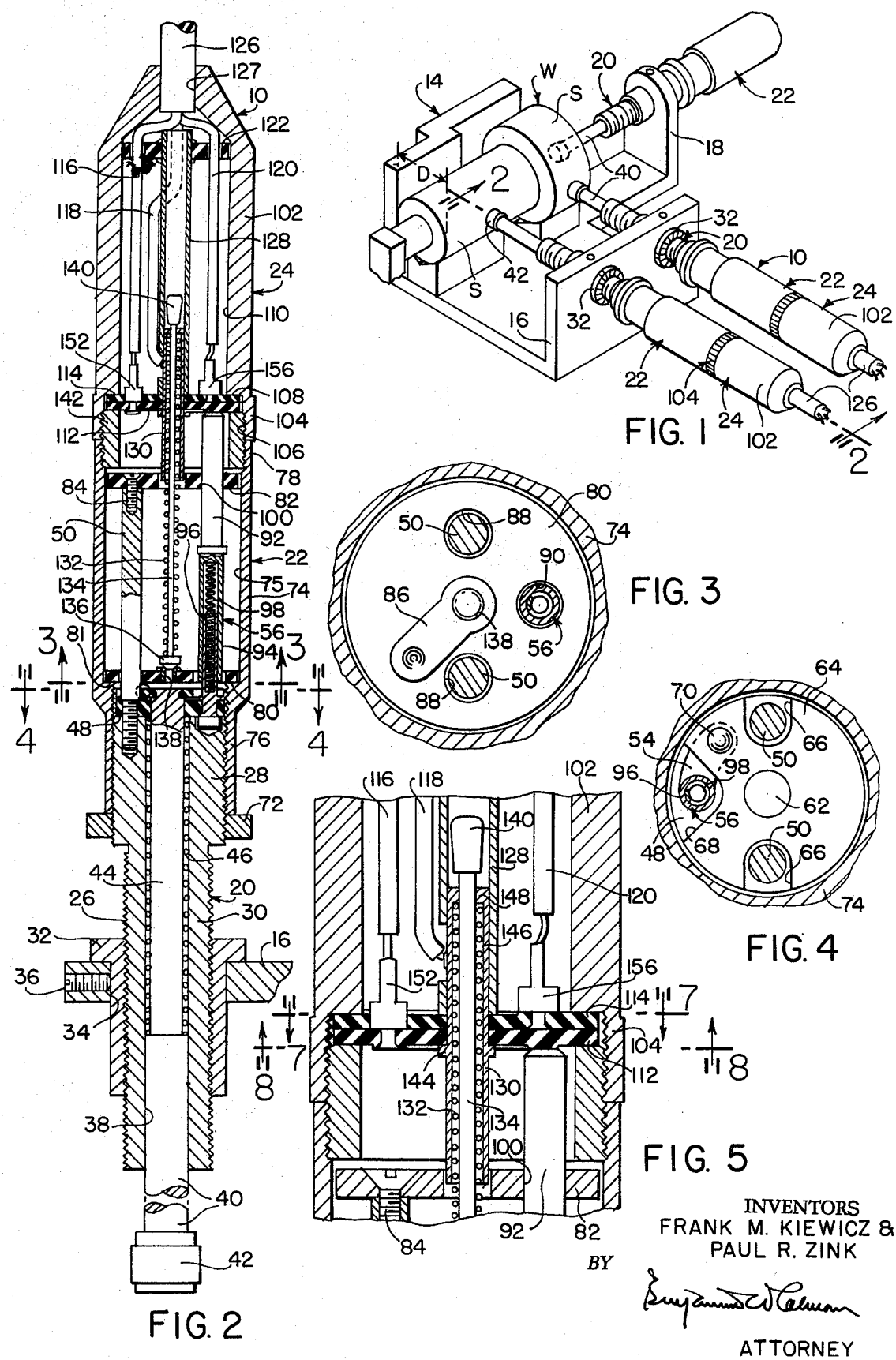

INVENTORS
FRANK M. KIEWICZ &
PAUL R. ZINK

BY

ATTORNEY

INVENTORS
FRANK M. KIEWICZ &
PAUL R. ZINK
BY
ATTORNEY

GAGING HEAD CONSTRUCTION

The invention involves an improved gaging head embodying electrical switch-type components for making and breaking circuits electrically connected to an indicating or signalling system. This application discloses improvements over the invention disclosed and claimed in the co-pending application of Frank M. Kiewicz and Alfred Schneider, Ser. No. 771,836 filed Oct. 30, 1968, entitled "Gaging Device System," issued as U.S. Pat. No. 3,557,462 on Jan. 26, 1971. The improvements in the gaging head disclosed and claimed in the aboveidentified application include features providing a substantial increase in the gaging span or tolerance, namely from 0.001 to 0.250 inch, and an over-travel feature not provided for in the earlier disclosed gaging head. These improvements are provided not merely by an elongation of elements, but instead by a reorganization of components including additional elements having substantial advantages in gaging function over the earlier disclosed gaging head. It will be understood by persons skilled in the art that the improvements disclosed herein do not in any way indicate or suggest the obsolescence of the earlier disclosed gaging head. The improvements of the instant invention, however, materially extend the utility and applications of an electronic gaging head and the functions to be performed by it.

The components of the new improved gaging head are arranged so that predetermined high and low limits of a dimension to be gaged are pre-set in the head, such limits being adjustable and variable at any time at the option of the user. Variability of the tolerance setting, from 0.001 up to and including 0.250 inch, is such that changes in tolerance can be made by merely resetting a lock nut, repositioning the upper or high limit contact plate by turning the threaded adjusting ring, and relocking the nut against the adjusting ring to secure the upper contact plate in its new position. Variability is infinite.

The electrical and electronic circuitry operates at low current so that a minimum destructive effect is occasioned to the switch-type contacting elements and surfaces in the gaging head, thereby maintaining an extremely high degree of accuracy for a very long period of time. The gaging head and circuitry system herein disclosed use minute quantities of current with little or no deterioration of the contact faces and points. The use of an appropriate low current, with very little or no appreciable arcing effect, permits a much closer positioning of the contact surfaces so that very small tolerance spans of 0.001 inch, or in some instances less than that, can be achieved.

It is therefore an object of the invention to provide a gaging head in association with an electronic signalling system operating at low current, wherein the improved gaging head embodies features providing a substantially increased tolerance span and an overtravel feature of the indicator point. Another object is to provide in a switch-type gaging head a greatly increased span of high and low tolerance limits individually and independently established and adapted to function with the overtravel feature. Yet another object is the provision of a relatively sensitive and easily adjustable gaging head for sensing the presence of an undersize, an oversize, or a within-tolerance dimension being gaged, within substantially wide limits, and for indicating the presence of any such dimension by a signalling system, and further embodying an overtravel feature for the indicator point.

Various further and more specific objects, features and advantages of the invention will appear from the description given below, taken in connection with the accompanying drawings, illustrating by way of example a preferred form of the invention. Reference is here made to the drawings annexed hereto and forming an integral part of this specification, in which FIG. 1 is a perspective view of a gaging device in which the improved gaging heads are arranged for gaging each of three different dimensions of a work piece.

FIG. 2 is an enlarged longitudinal sectional axial view taken substantially on the line 2—2 of FIG. 1, through one of the improved gaging heads.

FIGS. 3 and 4 are slightly enlarged transverse sectional views taken substantially on the lines 3—3 and 4—4 of FIG. 2.

FIG. 5 is a fragmentary enlarged longitudinal sectional view of a portion of the switching mechanism in the area of the adjusting ring where it is coupled to the cap of the gaging head.

Figure 7:
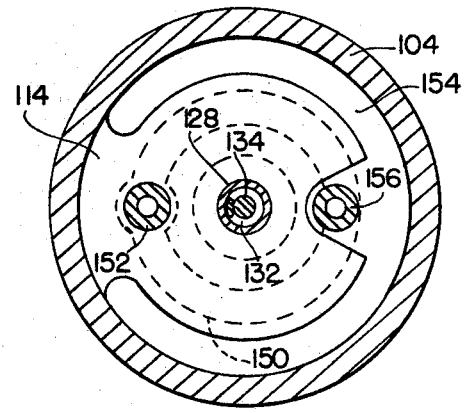
Figure 8:
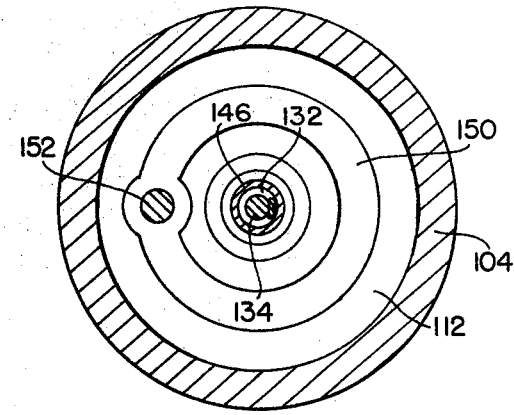

FIGS. 7 and 8 are transverse sectional views taken substantially on the lines 7—7 and 8—8 of FIG. 5.

Figure 6:
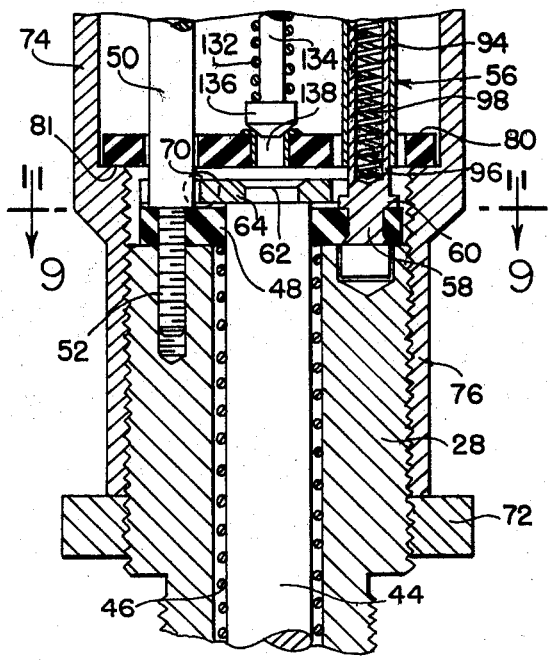
FIG. 6 is another fragmentary somewhat enlarged longitudinal sectional view of the switching mechanism in the area of the adjusting ring where it is adjustably secured to the indicator stem barrel, the movable contact plate being in contact with the fixed lower contact plate and is gaging a low limit dimension.
Figure 9:
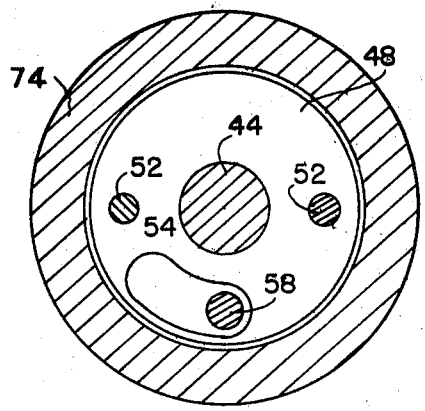

FIG. 9 is a transverse sectional view taken substantially on the line 9-9 of FIG. 6.

Figure 10:
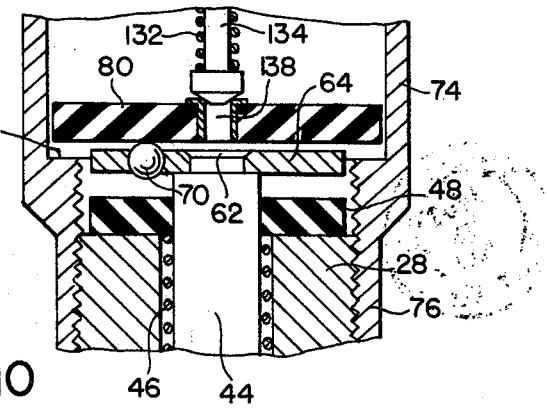

FIG. 10 is a fragmentary somewhat enlarged longitudinal sectional view of the switching mechanism in the area of the adjusting ring when the movable contact plate has been moved into contact with the upper contact plate and is gaging a high limit dimension.

Figure 11:
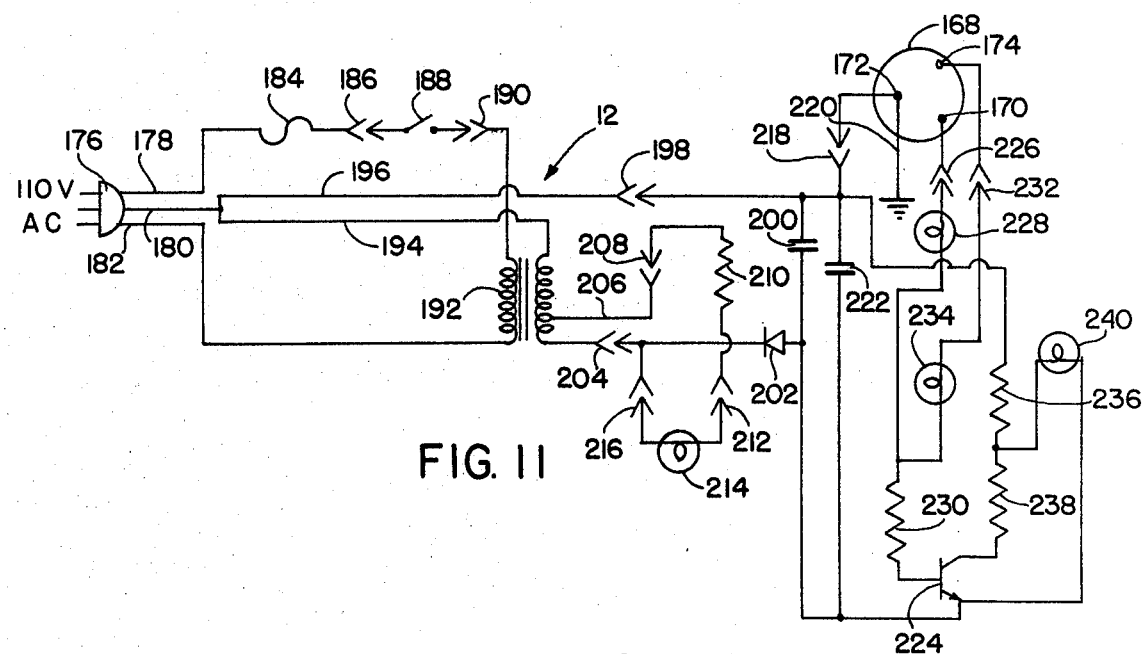

FIG. 11 is a schematic wiring diagram of the electronic signalling system to which the improved gaging head is electrically connected.

Figure 12:
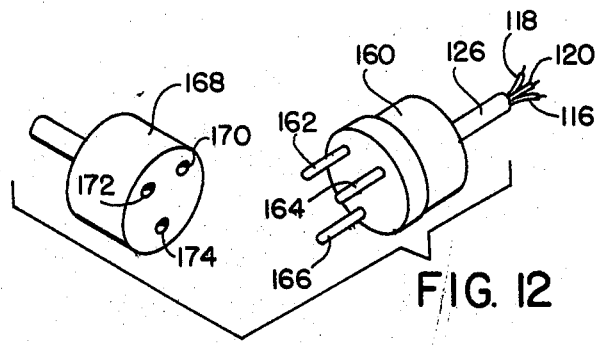

FIG. 12 is a perspective view of a conductor and signalling circuit plug and receptacle utilized in the disclosed embodiment of the invention.

In the preferred embodiment of the invention described and illustrated herein, the gaging system comprises the improved gaging head 10 electrically connected to and in the circuitry 12. The gaging head, or a plurality of them as illustrated in FIG. 1, is adapted to be secured in a gaging fixture 14 having gage head supporting members 16 and 18 so arranged that the gaging head indicator point makes contact with a surface S of the work piece W that is disposed for gaging in the fixture 14.

The gaging head 10 generally comprises a barrel assembly 20, the adjusting ring assembly 22 and the cap assembly 24.

The barrel assembly 20 of the improved gaging head comprises the barrel 26 having a proximal body portion 28 externally threaded for engagement with the adjusting ring assembly and a distal hub section 30 externally threaded for adjustable engagement with a split bushing 32 which seats in the opening 34 of the support member 16 (FIG. 2) and is engaged in locking position upon the barrel portion 30 by a locking set screw 36. The barrel 26 is provided with an axial longitudinal bore 38 adapted to slidingly receive the indicator stem 40 provided with an indicator point 42 at its distal end and a hub portion 44 of reduced diameter at its proximal end about which a biasing return spring 46 is concentrically disposed within bore 38.

Disposed upon and fixedly secured to the distal end of the barrel body portion 28 is the lower contact plate 48 made of an electrical insulating material such as a rigid stable glass epoxy or of an equivalent printed circuit board-type material. The contact plate 48 is secured to the barrel portion 28 by a pair of guide posts 50,50 which have threaded end portions 52,52 of reduced diameter threadedly engaged in the body portion 28 through openings in the lower contact plate 48 until the shoulders of the guide posts are fully seated against the contact plate (FIGS. 6 and 9). The exposed face of the lower contact plate 48 is provided with a copper contact area 54 that is deposited thereon by conventional printed circuit board practices and procedures. Secured to the lower contact plate in the contact area 54 and electrically connected thereto is the terminal post 56, its lower end 58 being provided with an upper shoulder 60 making electrical connection with the contact area 54 and being upset at its distal end to fixedly secure the terminal post to the lower contact plate 48.

The indicator stem hub portion 44 is provided at its distal end with a reduced hub 62 securing the metallic movable contact plate 64 to the distal end of the indicator stem hub portion 44 (FIG. 6). As shown more clearly in FIG. 4, the metallic contact plate 64 is provided with a pair of diametrically opposed notches 66,66 which make sliding contact with the guide posts 50,50, and with a notch 68 which clears and makes no contact with the terminal post 56. The metallic contact plate 64 is provided with a contact ball 70 fixedly secured in the plane of the contact plate, having a diameter greater than the thickness of the contact plate so as to extend beyond each planar side surface thereof, and so disposed that it is normally adapted to make electrical contact and connection with the copper contact area 54 of the lower contact plate 48 under the bias of the indicator stem return spring 46. Thus, as the indicator stem retracts in its barrel 26, the movable metallic contact plate 64 slides upon the guide posts 50,50, the contact ball 70 breaking contact with the lower plate contact area 54.

The lock nut 72 is threadedly adjustable upon the barrel body portion 28 to perform the tolerance adjusting function with the adjusting ring assembly which will be described more specifically below.

The adjusting ring assembly 22 comprises a substantially cylindrical body 74 having a counterbore 75 and an internally threaded hub section 76 of reduced diameter at one end thereof and an internally threaded portion 78 at the other end thereof, a freely movable upper contact plate 80 normally seated and at rest upon the counterbore seat 81 out of contact with the contact plate ball 70, and a stop plate 82 fixedly secured to the distal ends of the guide posts 50,50 by screws 84. The upper contact plate 80 and the stop plate 82 are each made of an insulating material such as the rigid stable glass epoxy or equivalent printed circuit board-type material utilized for the lower contact plate 48. The movable upper contact plate 80 is provided with a copper electrically conductive contact area 86 deposited thereon by conventional printed circuit board practices and procedures. The copper contact area 86 is disposed on the side facing the movable metal contact plate 64 and extends from the axial center of the plate 80 toward the outer perimeter of the plate intermediate an opening 88 for a guide post 50 and an opening 90 for the terminal post 56, particularly as illustrated in FIG. 3. The copper contact area 86 makes electrical connection and contact with the contact ball 70 of the movable metallic contact plate 64 when touched thereby.

The terminal post 56, one end 58 of which is secured to the lower fixed contact plate 48, further comprises the upper terminal contact member 92 and its lower tubular portion 94 telescopically and slidingly disposed about and upon the tubular terminal contact element 96 having the lower end portion 58 at its proximal end. A coiled helical spring 98 is slidingly disposed within the chambers of the tubular elements 94 and 96 to bias them apart. The upper terminal contact member 92 is slidingly disposed in and through opening 100 of the upper fixed stop plate 82.

As the barrel assembly 20 is threadedly advanced outwardly of the adjusting ring hub portion 76, the fixed lower contact plate 48 moves with it carrying along the tubular contact element 96, thereby allowing expansion of the coil spring 98 within the upper terminal contact element 94 and biasing it upwardly to make electrical contact with the lower contact disc 112 in the cap assembly 24.

The cap assembly 24 comprises a cap body 102 having an externally knurled annular end portion 104 with an internal thread 106 at the distal end thereof, a counterbore seat 108, a bore 110, contact discs 112 and 114, conductors 116, 118 and 120, a conductor insulator plate 122 having openings therethrough to pass the conductors as a cable 126 to the exit opening 127 of the cap body 102, a tubular guide member 128 fixedly secured to the insulator plate 122 at one end and to the contact discs 112 and 114 adjacent its opposite end, a tubular member 130 telescopically secured to and within the said opposite end of the guide member 128 and having its distal end open and free to receive a coiled helical spring 132 concentrically arranged upon a plunger rod 134 which has a contact head 136 at its distal end disposed to make electrical contact with the contact area 86 through grommet 138 of the upper movable contact plate 80 and a head 140 at its opposite end slidingly disposed within the tubular guide member 128 beyond the telescoping tubular member 130.

The cap assembly 24 is provided further with an externally threaded lock sleeve 142 which is threaded into the portion 106 at the distal end of the cap body 102, and upon which the internally threaded portion 78 of the adjusting ring body can be threadedly secured up to the distal end face of the cap body annular portion 104.

As shown more particularly in FIGS. 5, 7 and 8, the contact discs 112 and 114 are mounted upon the tubular member 130 at its shoulder 144 formed as an annular rib, the upper portion 146 of which is fixedly and telescopically secured within the distal end of the tubular guide member 128. The contact discs 112 and 114 are tightly secured together between shoulder 144 and the distal end face of the guide member 128. A suitable adhesive is also applied to the interface surfaces of the contact discs to improve their mutual adherence. The proximal end 148 of the tubular portion 146 is closed except for an opening which allows the upper end of the plunger rod 134 to slide therethrough. The head 140 on the plunger rod 134 is disposed outwardly of the upper end 148.

The contact disc 112, as illustrated particularly in FIGS. 5 and 8, is provided on its exposed side with a copper contact ring area 150 which is circular in design and makes electrical connection with a terminal post 152, connecting the conductor 116 to the contact area 150, which in turn is contacted and makes an electrical connection with the upper terminal contact member 92, a portion of the terminal post 56. The upper contact disc 114, more particularly illustrated in FIGS. 5 and 7, is provided with a circular outer ring contact area 154 disposed substantially about the perimeter of the contact disc except in the area adjacent the terminal post 152. A second terminal post 156 makes electrical connection with this contact area 154 and is connected to the conductor 120 forming part of the cable 126.

The conductor cable assembly 126 issuing through the opening 127 of the cap body 102 comprises the insulated conductors 116, 118 and 120 leading from and electrically connected to the terminal post 152, the terminal tubular guide member 128, and the terminal post 156, respectively, and an outer insulating sheath. These conductors 116, 118 and 120 terminate in the plug 160 and are each electrically connected to the conductor prongs 166, 162 and 164, respectively (FIG. 12). These plug prongs are arranged for reception in and connection with the coupling receptacle 130 having prong receiving contact terminals 170, 172 and 174 suitably secured therein.

As more particularly illustrated in FIG. 11, the electronic circuitry 12 comprises the power plug 176 for connection with a source of alternating current line voltage con-ductor having conductors 178, 180 and 182 leading therefrom. The conductor 178 connects in series a fuse 184, a plug and jack 186, a manually operated on-off switch 188, a second plug and jack 190 and one end of the primary winding of a step-down transformer 192. The conductor 182 is connected to the other end of the primary winding, completing the primary circuit.

The secondary winding of the transformer 192 has one end connected to a conductor 194 which is in turn connected to the conductor 180 and to the series circuit including the conductor 196, the plug and jack 198, the capacitor 200, the diode 202, and the plug and jack 204 connected to the other end of the secondary winding of the transformer 192, forming a conventional half-wave rectifying circuit. The tapped winding of the secondary further connects in a series circuit by conductor 206 with the plug and jack 208, the resistor 210, the plug and jack 212, the pilot signal lamp 214, and the plug and jack 216, forming the pilot lamp circuit. One end of the transformer secondary winding is connected to the alternating current source ground by way of conductors 194, 180, 196, the plug and jacks 198 and 218, the terminal receptor 172 and the conductor 220. The capacitors 200 and 222 are connected in parallel, one side served by the conductor 196, the other side connected to the emitter of the transistor 224.

A series circuit comprising the plug and jack 226, the signal lamp 228 and the resistor 230 is connected to the terminal receptor 174 and to the base of transistor 224. Another series circuit comprising the plug and jack 232, the signal lamp 234 and the resistor 230 is also connected to the base of the transistor 224, its other end being connected to the terminal receptor 170. A series circuit comprising the resistors 236 and 238 is connected to the collector of the transistor 224 at one end and to one junction of the capacitors 200 and 222 at the other end. The emitter of the transistor 224 connects to the second junction of the capacitor 200 and the diode 202. One terminal of the signal lamp 240 is connected to the junction of the resistors 236 and 238 and its other terminal to the emitter of the transistor 224.

The electronic circuitry 12 provides indicating means for signalling the presence in the work piece W, at any particular dimension D being gaged by the gaging head 10, of an undersize dimension by the signal lamp 234, or of an oversize dimension by the signal lamp 228, or an indication by the signal lamp 240 that the gaged dimension is within the tolerance limits established by the positions of the lower contact plate 48 and the upper contact plate 80 when adjusted by the threaded engagement of the adjusting ring body 74 upon the threaded portion 28 of the barrel 20 to which it is locked by the lock nut 72.

The operation of the improved gaging head 10 in the gaging system of this invention is as follows. A master work piece W is first positioned in a suitable manner in the fixture 14 designed to support one or more of the gaging heads 10 in gaging relationship to the work piece. The barrel hub portion 30 with the split bushing 32 threaded thereon is secured in the fixture opening 34, to be later locked in position by the set screw 36 when the indicator point 42 is finally established in proper gaging position with respect to the surface S of any dimension D to be gaged. The dimension D may be any diameter, width, thickness or length of any portion of the work piece W.

The tolerance limits of the gaging head 10 are first established. This is done by means of the adjusting ring body 74 which is adjustably threaded upon the barrel body portion 28. It will be noted, particularly with reference to FIGS. 1 and 6, that the movable upper contact plate 80 is seated directly upon and against the counterbore seat or shoulder 81 of the adjusting ring body. It will be further observed that the plunger rod head 136 under the bias of the coil spring 132 bears directly upon and against the upper contact plate grommet or eyelet 138 and makes electrical connection therewith.

The movable upper contact plate 80 when seated against the counterbore shoulder 81 is spaced a distance from the lower contact plate 48 which is secured to and against the proximal end of the barrel portion 28, the spacing between their respective printed copper contact portions 86 and 54 being substantially equivalent to the tolerance limits for the "-go" dimension of the work piece being gaged. The travel of the contact ball 70 in the movable metal contact plate 64 from one side of the ball to the other side where it makes contact first with the lower contact plate and then with the upper contact plate is also a measure of the tolerance limits for this dimension. Once this tolerance limit is established, the lock nut 72 is threadedly secured upon the barrel portion 28 against the distal end of the adjusting ring hub portion 76; and the latter then being fixed in position, the tolerance spacing of the movable upper contact plate 80 also becomes fixed.

For normal gaging operation after the work piece has been placed in the fixture 14 in gaging position, the bias of the plunger rod 134 against the movable upper contact plate 80 holds the latter to its counterbore seat 81 in a resilient manner under the bias of the coil spring 132. Thus, if the work piece has a flange that interferes with the extended position of the indicator point, or the work piece dimension D being gaged is substantially oversized, the required travel or retraction of the indicator stem 40, the metallic movable plate 64 and the upper movable contact plate 80 may be such as to move the latter upon the guide posts 50,50 against the bias of the plunger rod 134 up to the stop plat 82.

Once the tolerance limits of the lower contact plate 48 and the upper movable contact plate 80 have been fixed, and the gaging head barrel assembly 20 firmly fixed in the fixture supporting member, the indicator point 42 is positioned against the master work piece W having a known specified dimension to be gaged. The setting of the barrel assembly 20 is then established, so that movement of the indicator stem 40 properly positions the metallic movable contact plate 64 for closing one or the other of the signalling circuits, as will be more fully described below. The improved gaging head 10 is especially adapted for use with a work piece W requiring substantial retraction of the indicator point in order to allow for insertion and removal of the work piece W on the fixture 14, or for work pieces having substantial variation in the dimension to be gaged. This retraction feature is particularly provided by the extended plunger rod 134 and its biasing spring 132, the tubular guide members 128 and 130 in which the plunger rod slides, and the stop plate 82 affixed to the distal ends of the guide posts 50,50. The insulating stop plate 82 sets the limit of travel for the indicator stem so as to prevent damage to the gaging mechanism.

Thus, should a sheet metal part require gaging, though it have extended flanges in the area adjacent the dimension to be gaged, the indicator stem 40 and point 42 can be substantially retracted to allow the flange portion of the work piece to enter the fixture area. After the work piece has been properly positioned in the fixture, the indicator stem is released to gaging position with respect to the work piece surface and dimension to be gaged. This retractable feature of the improved gaging head materially and substantially expands its scope and utility.

The signalling system of the electronic circuitry 12, served by a conventional source of alternating current through the plug 176, is substantially the same as that described in the Kiewicz et al. application No. 771,836 filed Oct. 30, 1968. However, for purposes of this disclosure, a simple description of the operation of the circuitry is given, although persons skilled in the art will upon reference to the aforesaid application readily understand and appreciate the operation and function of circuitry 12 of this application. Assuming that all of the plug and jacks described above and illustrated in FIG. 11 are in electrical contact and connection, when current is introduced to the circuit through the connector plug 176 and gaging head plug 160 is connected with its complementary receptacle 168 (FIG. 12), the pilot lamp 214 is illuminated by current when the manual switch 188 is closed, visually indicating that energy is provided for the dimensional signalling initiated by the gaging head 10. If the dimension D being gaged is undersize, the signal lamp 234 will be lit; when oversize, the signal lamp 228 will light up; and when the dimension is within the tolerance limits established by the spacing between the lower fixed contact plate 48 and the upper movable contact plate 80, the signal lamp 240 will light up.

Undersize signalling is initiated when the indicator stem 44 brings the movable contact plate 64 into ball contact with the copper contact area 54 of the lower fixed contact plate 48. Oversize signalling is accomplished when the ball 70 of the movable contact plate 64 makes electrical contact with the copper contact area 86 of the upper contact plate 80.

When the dimension D is undersize, the signalling circuit provides a current path through a series circuit from the positive side of the half-wave rectifier comprising the capacitor 200, the terminal receptor 172, the plug prong 164, conductor 120, the terminal post 156, copper contact ring 154, the cap body 102, the adjusting ring body 74, the barrel hub portion 28, the indicator stem hub portion 44, the movable metallic contact plate 64, contact ball 70, the copper contact area 54, terminal post 56, the copper contact area 150, terminal post 152, conductor 116, the plug prong 166, connector terminal 174, the signal lamp 234, resistor 230, the base emitter junction of transistor 224, and to the negative side of the half-wave rectifier which is the junction of the capacitor 200 and diode 202. The establishment of this current circuit through the lamp 234 causes it to become illuminated and signal the presence of an undersize dimension. The same current flows through the base emitter junction of transistor 224 to bias the transistor and cause collector current to flow from the positive side of the half-wave rectifier through resistors 238 and 236 and transistor 224 to the negative side of the half-wave rectifier. This collector current flow through resistor 236 causes a voltage drop across the resistor 236 which lowers the voltage across the signal lamp 240 to a value below that required to illuminate the lamp. In this manner, the establishment of current through the signal lamp 234 occasioned by the presence of an undersize dimension causes lamp 240 to be extinguished.

An oversize dimension is signalled by travel of the indicator stem 40 upwardly, as illustrated in FIGS. 1 and 6, the circuit to signal lamp 228 being as follows. A series circuit is provided from the positive side of the half-wave rectifier through the terminal receptor 172, the plug prong 164, the conductor 120, contact ring 154, cap body 102, adjusting ring body 74, the barrel body portion 28, the indicator stem 40, the movable metallic contact plate 64, contact ball 70, the upper movable contact area 86, the metal eyelet 138, the plunger rod 134, the tubular members 130 and 128, conductor 118, plug prong 162, the receptacle terminal 170, the conductor to the signal lamp 228, the resistor 230, the base emitter junction of transistor 224 and to the negative side of the half-wave rectifier at the junction of the diode 202 and the capacitor 200. The establishment of this current circuit through the signal lamp 228 causes it to become illuminated and signal the presence of an oversize dimension. The same current flow through the transistor base emitter junction biases the transistor 224 and causes collector current to flow from the positive side of the half-wave rectifier through resistors 236 and 238 and the transistor 224 to the negative side of the rectifier. Flow of collector current through the resistor 236 effects a voltage drop there-across sufficient to lower the value of the voltage across the signal lamp 240 below that required to illuminate it. In this manner, the establishment of current flow through the signal lamp 228 due to the presence of an oversize dimension causes the signal lamp 240 to be extinguished.

If a circuit to either of signalling lamps 228 or 234 should not be closed, as when the movable metal contact plate 64 and its contact ball 70 are disposed in a position intermediate and spaced from the copper contact area 54 on the lower contact plate 48 and the copper contact area 86 on the upper movable contact plate 80, occasioned by the dimension D being within the predetermined pre-set tolerance limits, either of the above-described undersize or oversize current circuits to the signalling lamps 234 and 228 respectively will then be closed, shutting off current through the base-emitter junction of transistor 224. Since the transistor will then be biased off, preventing collector current flow through the resistor 236, the voltage drop across this resistor will be very small or non-existent, raising the voltage across the signal lamp 240 to a value sufficient to illuminate the lamp by current flow supplied by the half-wave rectifier. Thus, an absence of current flow through the lamps 234 and 228 causes the signal lamp 240 to be illuminated, indicating the presence of a within-tolerance dimension.

The signalling circuit portion beyond the secondary winding of the transformer 192 is of relatively low current, as for example a 2-milliampere current to the signal lamps 228, 234 and 240. The on-off pilot lamp 176 is powered by the tapped secondary winding of the transformer 192. The on-off pilot lamp 214 when illuminated indicates the presence of current passing through the electronic signalling circuit 12 from the power plug 176 through the step-down transformer 192 and the diode 202.

The representation of the fixture 14 is to be understood as being merely schematic, a fixture normally being designed by persons skilled in the art for use with particular work pieces and the gaging equipment required. The gaging device of this invention is particularly adapted to be used with flanged metal stamping parts or work pieces having extensions beyond the surfaces and dimensions to be gaged, whereby the retractable feature of the gaging heads 10 is required.

The insulating contact plates and discs 48, 80, 82, 112, 114 and 122 are preferably made of a glass epoxy or equivalent printed circuit board-type material. The remainder of the gaging head elements are preferably made of suitable steel, aluminum, copper, or other metallic materials.

It will be observed from the description given above that the retraction of the indicator stem 40 moves the upper movable plate 80 against the plunger rod 134 for a distance up to the under surface of the stop plate 82. This distance can be very substantial, for instance as much as from one to two or more inches, whereby the indicator point 42 can be retracted out of the way of any flange or extension element of the work piece W adjacent the area of the dimension to be gaged.

The circular printed contact portion 150 of the contact disc 112 and the printed copper contact ring 154 of the contact disc 114 permit connection with the terminal post 56 at any rotated position of the cap body 102 with respect to the adjusting ring body portion 74. Inasmuch as the lower contact plate 48 is maintained in a fixed position by the guide posts 50,50 threadedly secured to the barrel body portion 28 and the movable metallic contact plate 64 is guided by such guide posts in a posture such that the ball 70 is always in register (a) with the printed copper contact area 54 of the lower contact plate 48 and (b) with the printed copper contact area 86 of the upper movable contact plate 80, also positioned upon the guide posts 50,50, the spacing of these copper contact areas from each other determines the tolerance limits established by the adjusting ring hub portion 76 upon the threaded barrel body portion 28.

Although a particular preferred embodiment of the invention has been disclosed herein for purposes of explanation, further modifications or variations thereof, after study of this specification, will or may become apparent to those skilled in the art to which the invention pertains. Reference should be had to the appended claims in determining the scope of the invention.

We claim:

1. In a gaging head for a fixture-type gaging system designed to gage a dimension of a workpiece having an excess of material in the gaging area requiring substantial retraction of the gaging indicator point, the improvement combination comprising an elongated adjusting ring, an elongated barrel adjustably secured to one end of the adjusting ring, an indicator stem slidably movable in said barrel and having an indicator point at its distal end disposed outboard of said barrel for making surface contact with said workpiece dimension being gaged, a cap removably secured to the other end of said adjusting ring, and an electrical switch contained within said adjusting ring and said cap comprising a first fixed contact plate secured to the proximal end of said barrel within said adjusting ring, a second contact plate axially movable in said adjusting ring and spaced apart from said first contact plate, movable switch contact means secured to the proximal end of said indicator stem, intermediate said first and second contact plates, and spaced from said second contact plate in its at-rest position, means for guiding said second contact plate and said movable switch contact means secured to said proximal end of said barrel and extending from said first fixed contact plate at the barrel proximal end into the proximal end region of said elongated adjusting ring, an extensible post secured to said first contact plate within said adjusting ring and extending into said cap, stop means secured to the distal end of said guide means for limiting the axial travel of said second contact plate within said adjusting ring, means extending from said cap through said adjusting ring for biasing said second contact plate toward said movable switch contact means, and contact discs secured within said cap, one of said discs adapted to be contacted by said terminal post, whereby said movable switch contact means and said second contact plate are movable upon said guide means into the upper reaches of said adjusting ring to said stop means upon substantial retraction of said indicator stem.

2. The improved gaging head defined in claim 1, wherein
said indicator point is disposed outboard from the distal end of said barrel a distance substantially equal to or greater than the maximum travel distance of said second contact plate within said adjusting ring, when said gaging head is fixture-mounted in dimension gaging attitude.

3. The improved gaging head defined in claim 1, wherein
said barrel is threaded externally, an internally threaded split bushing is secured in said fixture and adapted to adjustably support and secure said threaded barrel therein.

4. The improved gaging head defined in claim 1, wherein
said elongated adjusting ring comprises
a body having a counterbore and a bore therein adjacent said elongated barrel,
said fixed first contact plate being fixedly secured to the proximal end of said barrel by said guide means and disposed in said bore,
said second contact plate being movably disposed in said counterbore and having an at-rest position upon the seat of said counterbore,
said biasing means bearing upon said second contact plate substantially axially thereof to bias the same toward its at-rest position against said counterbore seat.

5. The improved gaging head defined in claim 1, wherein
said movable switch contact means comprises
a third contact plate secured to the proximal end of said indicator stem and disposed intermediate and spaced from said first and second contact plates.

6. The improved gaging head defined in claim 1, and including
resilient means in said barrel biasing said third contact plate toward said first contact plate.

7. The improved gaging head defined in claim 1, wherein
said cap comprises
a chambered body,
a hub portion at one end,
a lock sleeve removably secured in said hub portion and adapted to securely engage a complementary portion of said adjusting ring.

8. The improved gaging head defined in claim 7, and wherein
said contact discs are secured within a counterbore of said cap hub portion by said lock sleeve at a distance removed from said stop means.

9. The improved gaging head defined in claim 1, wherein
each of said contact discs, in back-to-back relationship, has a contact area on the outwardly directed surface thereof,
said one disc facing outwardly of said cap having its contact area on its outer face adapted to make contact with said terminal post.

10. The improved gaging head defined in claim 1, wherein
said terminal post comprises
a lower end portion extending through said first contact plate and having a shoulder adjacent said latter plate and being upset to secure said latter plate against said shoulder,
an upper terminal contact member adapted to make contact with the contact area of one of said contact discs and having a lower tubular end portion,
a tubular contact element secured to said lower end portion and telescopically and slidingly disposed within said lower tubular end portion of said upper terminal contact member,
and resilient means disposed within said tubular contact element biasing said upper terminal contact member therefrom.

11. The improved gaging head defined in claim 10, and wherein
said upper terminal contact member is slidingly disposed in and through an opening in said stop means.

12. The improved gaging head defined in claim 5, wherein
said movable switch contact means further comprises
a contact ball secured in said third contact plate so that a portion of said ball projects from each side of said plate.

13. The improved gaging head defined in claim 7, wherein
said means biasing said second contact plate toward said movable switch contact means comprises
a tubular guide member affixed to and within said cap chambered body,
a second tubular member telescopically and slidingly disposed within said guide member,
said contact discs being secured upon said second tubular member against the distal end of said guide member,
a plunger rod slidingly disposed in said second tubular member and having its distal end projecting outwardly therefrom and into contact with said second contact plate,
and resilient means biasing said plunger rod distal end into contact with said second contact plate.

14. The improved gaging head defined in claim 7, wherein
said stop means comprises a stop plate secured to the distal ends of said guide means adjacent said lock sleeve.

* * * * *